United States Patent [19]

Siegal

[11] Patent Number: 4,564,846

[45] Date of Patent: Jan. 14, 1986

[54] DROP ON DEMAND DOT MATRIX PRINTING HEAD

[75] Inventor: Burton L. Siegal, Skokie, Ill.

[73] Assignee: Kiwi Coders Corporation, Wheeling, Ill.

[21] Appl. No.: 665,030

[22] Filed: Oct. 26, 1984

[51] Int. Cl.[4] .............................................. G01D 15/18

[52] U.S. Cl. .................................. 346/75; 346/140 R; 400/126

[58] Field of Search .................... 346/75, 140; 400/126

[56] References Cited

U.S. PATENT DOCUMENTS

| | | | |
|---|---|---|---|
| 4,015,271 | 3/1977 | Sultan | 346/140 |
| 4,215,350 | 7/1980 | Mielke | 346/75 |
| 4,378,564 | 3/1983 | Cross | 346/75 |

FOREIGN PATENT DOCUMENTS 88630 9/1983 European Pat. Off. .

*Primary Examiner*—Joseph W. Hartary

*Attorney, Agent, or Firm*—Silverman, Cass & Singer, Ltd.

[57] ABSTRACT

A drop-on-demand printer system has a print head including a manifold plate and one nozzle plate for each desired printing nozzle array. The manifold plate carries dot valves each controlling the flow of ink to one nozzle of each array. Ink passed by each dot valve flows through an outlet passageway to an opening. The nozzle plates each mount a nozzle array on a front side surface in linear columns with staggered nozzles. On each nozzle plate back side surface, grooves couple ink from one manifold outlet passageway opening to one nozzle. The manifold outlet passageway openings are located to be symmetrical at 180 degrees of rotation so that all the nozzle plates can be mounted on the manifold plate in either one of two positions rotated 180 degrees from one another.

18 Claims, 10 Drawing Figures

FIG. 7
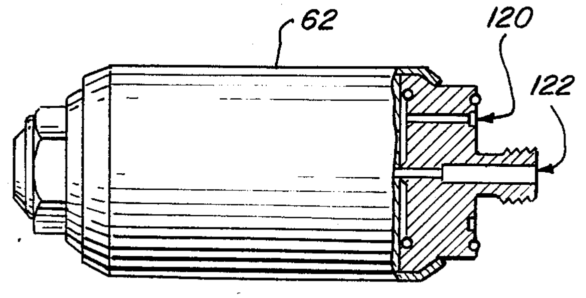
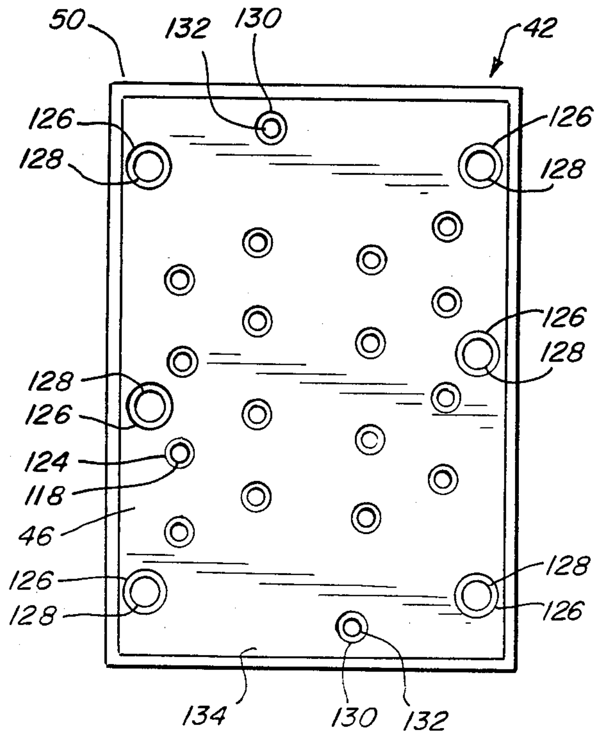
FIG. 8
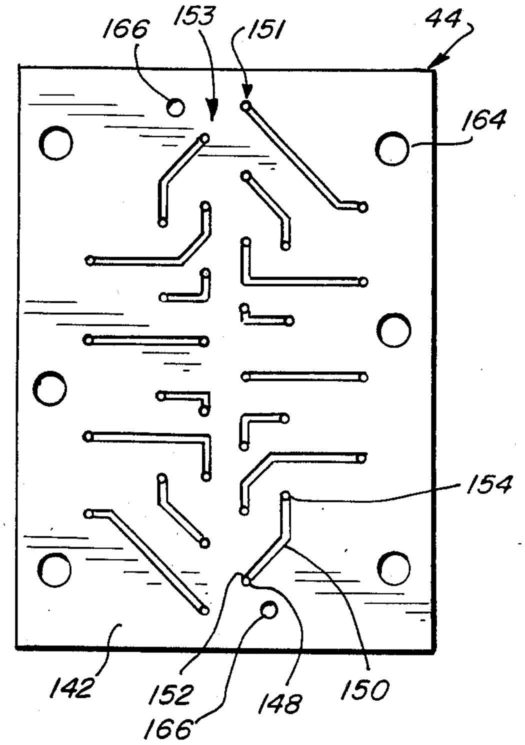
FIG. 9
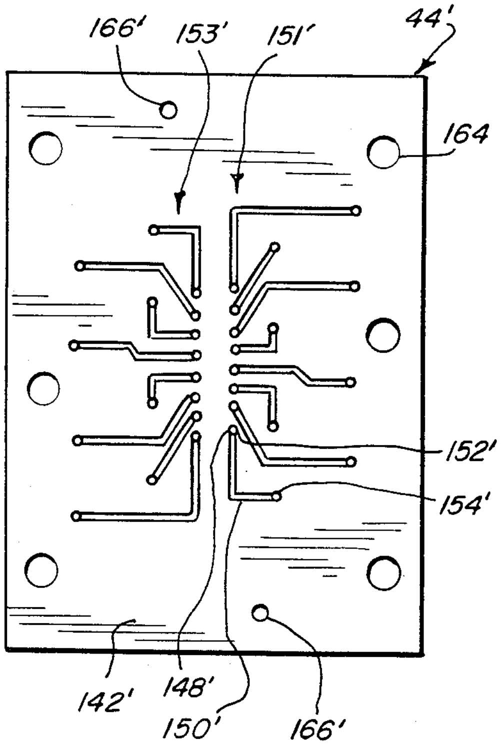
FIG. 10

DROP ON DEMAND DOT MATRIX PRINTING HEAD

BACKGROUND OF THE INVENTION

This invention relates generally to large character, dot matrix, drop-on-demand printers used, for example, to print shipping addresses on the side of cartons at a warehouse, and in particular, the invention relates to a novel printing head used in such a drop-on-demand printer.

Large character, dot matrix, drop-on-demand printer systems are growing in popularity for industrial and warehouse operations to print shipping information and inventory control data on the sides of cardboard and plywood cartons containing particular goods. Such printers print characters from ⅜" to as much as 3" in height using such as a 5×7 dot matrix character format to perform the printing as the carton is moved past the upstanding printing head nozzles. The 5×7 matrix is effected by 7 linearly arranged nozzles being used to print dots at each of 5 steps transverse of the nozzle line as the carton is moved therepast. Additional nozzles can be used to print two or more lines of copy, print larger sizes characters and enhance the readability of the resultant character. Four printing heads can be used for the usual four lines of addresses, and eight heads can be used to print on opposite sides of the cartons.

Users of the drop-on-demand printers regularly change the dot matrix spacing to conform the character size to their changing applications. Manufacturers of the drop-on-demand printers satisfy this need by supplying nozzle arrays of different spacing; the means for connecting the variously spaced nozzle arrays to the valving assembly being thin, flexible tubing. This tubing interconnection has one benefit, but has several drawbacks. The tubing is beneficial to aid in disconnecting a nozzle that is clogged and that can be cleared by vacuum or pressure applied directly to the nozzle to flush the nozzle clean.

The tubing connection arrangement is cumbersome, however. In changing to another nozzle array all seven or more (typically up to 16) closely bunched tubes must be removed from the one array and reconnected in the correct order to the new array. This is in addition to removing and replacing the nozzle array fasteners and is while the hanging tubing is dribbling ink. Of course, the shipping line is inactive during the changeover operation.

A more serious shortcoming occurs when a dot stops being printed; the cause can be either a manfunctioning valve or a clogged nozzle. Usually the operator stops the printing line and its attendant production while he searches for the cause and corrects it. The operator can interchange two of the ink supply tubes to determine whether the cause is the valve or nozzle but he later must remember to reconnect the tubes correctly. If the problem is the nozzle, he can flush it out, while the associated tube is hanging and dribbling ink, re-connect the tube, close the print head and continue printing. Clearing a clogged nozzle can be complicated by additional printing heads above and below the head or array comprising the offending nozzle. Heads or arrays customarily are arranged closely spaced on their mounting frame according to the desired location of the printing line on the container. Thus, clearing a clogged nozzle is tedious at best and the loss of printing and attendant production time is costly.

SUMMARY OF THE INVENTION

This invention overcomes these and other problems by providing a manifold plate that can be used to control the flow of printing ink to any one of several different sized nozzle arrays, each of which is used to print a different sized character. Each nozzle array is included in one nozzle plate than can be fastened to the manifold, and each nozzle plate provides conduits to adapt the differently spaced nozzle arrays to the fixed spacing of the controlled ink supply output passageway openings of the manifold plate. This eliminates the problems attendant to the interconnection of the ink control valves to the nozzle arrays with tubing, while as will be explained, obtaining simplicity in determining and facilitating cleaning any clogged nozzles.

The manifold plate comprises a generally rectangular, upstanding body carrying on its top side surface an ink suppply valve and a solvent supply valve used to control the flow of ink and solvent to the manifold plate from separate reservoirs. The solvent is used to flush the manifold and nozzle plates between printing runs. Sixteen (16) ink dot controlling valves or dot valves also are carried on the manifold top side surface, there being one dot valve for each nozzle in the linear array.

The manifold has a fluid distribution system therein formed by internal bores distributing the ink and solvent to the dot valves. The manifold also has sixteen (16) controlled fluid outlet passageways therethrough and opening on the manifold bottom side surface. The passages and openings are separated from the distribution system. There is one controlled fluid passage and associated supply opening for each dot valve with the dot valves controlling the flow of ink or solvent from the distribution system to the passages and openings. Timed electrical signals from a character generator controller energize the dot valves to control the fluid flow. Thus the timed electrical signals control the flow of ink from the manifold to form the dots of the desired character.

Each nozzle plate also is a generally rectangular body having a back side surface that operatively is fastened against the bottom side surface of the manifold plate to access the ink supply openings thereof. A planar gasket can be compressed between the manifold and nozzle plates to seal against fluid leakage while allowing ink passage to the nozzle plate. The nozzle plate comprises sixteen (16) nozzles linearly arranged in two equal columns and secured to extend from the front side surface of the nozzle plate. Each nozzle is essentially a small tube providing a precisely dimensioned orifice aiding in the formation of the character dots. The nozzle plate includes conduits arranged to receive the ink from the supply openings of the manifold plate and couple the ink to the nozzles from where it is ejected to the passing carton. These conduits comprise grooves formed in the back side surface of the nozzle plate and passageways extending through the nozzle plate from the nozzles, there being one groove and passageway for each nozzle.

The controlled flow of ink from the dot valves thus flows through the manifold passages outlet passageway openings and through the nozzle plate grooves, passageways and nozzles to the passing carton.

The manifold outlet passageway openings are arranged to be symmetrical at 180 degrees of rotation in the plane of the bottom side surface. The ink receiving ends of the nozzle plate grooves likewise are symmetrical at the same rotation. The manifold and nozzle plates are fastened together with such as six screws that are readily removable. Each nozzle plate thus can be removed and rotated 180° and re-fastened to the manifold plate to ascertain a clogged nozzle. Further, the removed nozzle plate facilitates vacuum and pressure flushing of such as fouled nozzle. All of this saves printing and production time.

BRIEF DESCRIPTION OF THE DRAWING

FIG. 7 is a side view, partially in section, of a dot ink control valve;

FIG. 8 is a plan view of a gasket overlaid on the manifold plate of the invention;

FIG. 9 is a plan view of the back side surface of the nozzle plate shown in FIG. 5; and FIG. 10 is a plan view of the back side surface of a nozzle plate having a nozzle array spacing different from that of the nozzle plate shown in FIGS. 5 and 9.

DESCRIPTION OF THE PREFERRED EMBODIMENT

Figure 1:
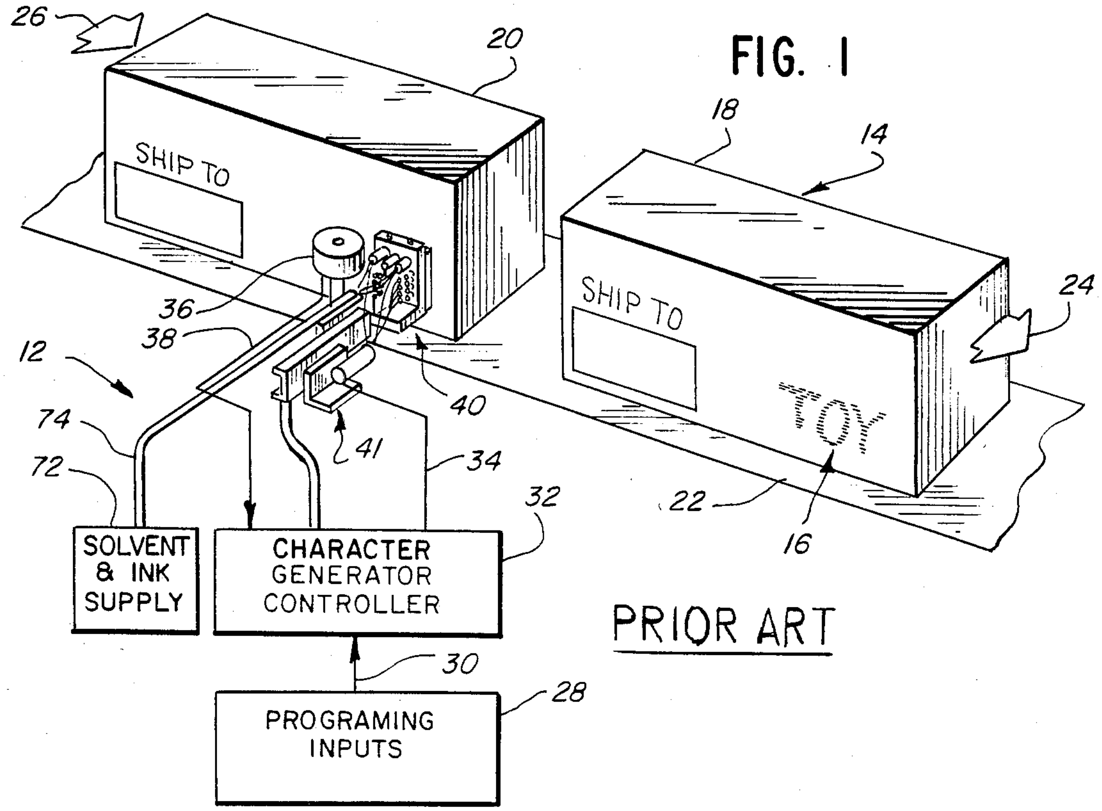
FIG. 1 is a perspective view of a drop-on-demand printer system installed on a shipping line, the printer system including a print head of the invention.

The drop-on-demand printer system comprising the invention is indicated generally in FIG. 1 by the character 12 and is operatively mounted along a shipping line 14 for printing characters such as the word "TOY" indicated at 16 on cartons 18 and 20. Cartons 18 and 20 are moved past the printer system 12 by such as a driven belt 22 moving in the direction indicated by arrows 24 and 26. Alternatively, the cartons 18 and 20 can be moved along rollers or a slide chute under gravity feed past the printer system 12.

Printer system 12 comprises programming inputs 28 for selecting the desired characters to be printed, the location of the characters on the carton and other related information to be used in printing desired characters on the cartons 18 and 20. The input information is carried by leads 30 to a character generator controller 32 that produces timed and other electrical signals on leads 34 in response to the input information and to speed and position information received from roller sensor 36 over leads 38. Roller sensor 36 is arranged to engage the sides of cartons 18 and 20 as they move therepast and to convert the non-sliding rotation of roller 36 caused by the carton into useable electrical signals indicating the carton speed and position. Alternatively, other sensing means can be used to determine carton speed and position and provide this information to controller 32.

Figure 2:
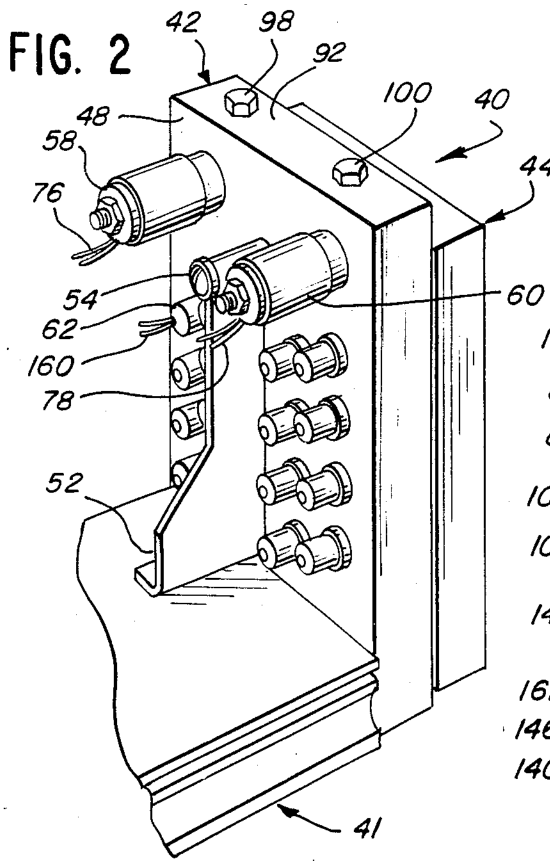
PRIOR ART FIG. 2
FIG. 2 is a perspective view of the print head of the invention.
Figure 3:
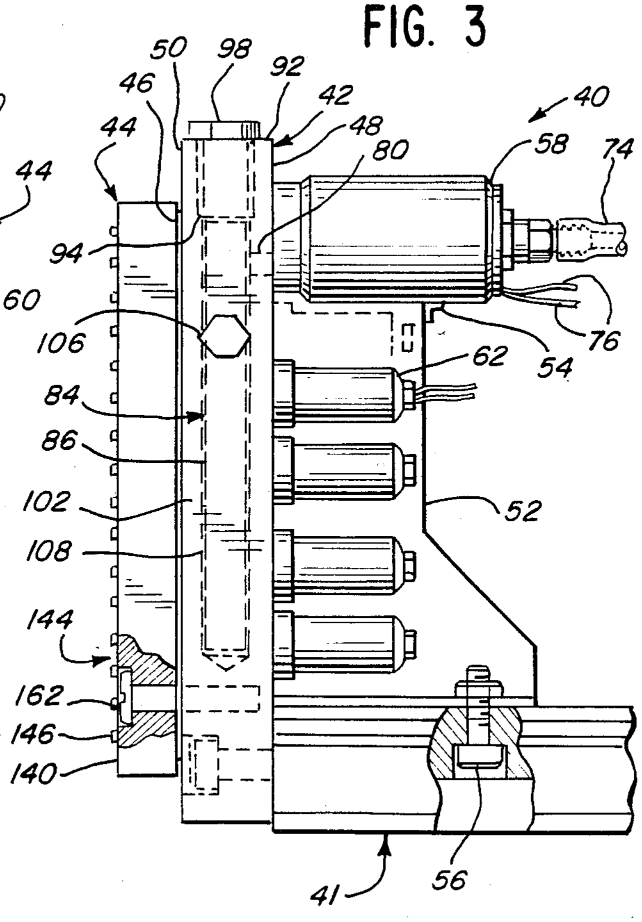
FIG. 3 is a side view of the print head of the invention.

Referring also to FIGS. 2 and 3, printer system 12 further comprises a print head assembly 40 suitably mounted by brackets 41 so that the printer head is upstanding adjacent the moving carton 20 to print the characters thereon. Print head assembly 40 comprises a manifold plate 42, a nozzle plate 44 and a gasket 46 compressed therebetween.

Figure 4:
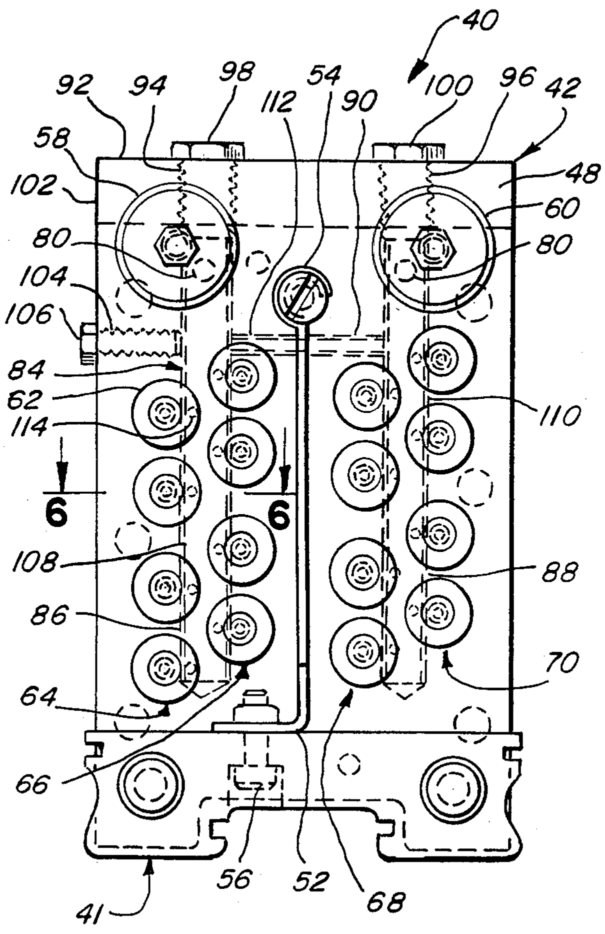
FIG. 4 is a plan view of the print head of the invention.

Referring also to FIG. 4, manifold 42 is a generally rectangular solid body vertically arranged upstanding and having a top side surface 48 and a bottom side surface 50. Manifold 42 is fixed to bracket 41 by another bracket 52 and fasteners 54 and 56.

Manifold plate 42 carries on its top side surface 48 two supply valves, an ink supply valve 58 and a solvent supply valve 60. Additionally, manifold plate 42 carries on its top side surface 48 sixteen (16) dot valves 62 arranged in four columns of four each dot valves. Only the top dot valve 62 in the first column 64 is identified by reference character for clarity of the drawing. The second, third and fourth columns of dot valves are indicated in FIG. 4 by numerals 66, 68 and 70 respectively. Each dot valve will be used to control the flow of ink to individual nozzles of nozzle arrays as will be explained.

Ink and solvent supply valves 58 and 60 regulate the timing and quantity of ink and solvent supplied to the print head 40 from reservoir or supply 72 (FIG. 1) through clear flexible tubing 74 to the top center of the valves 58 and 60. This regulation occurs in accordance with electrical supply signals received from controller 32 over leads 34 generally and particularly over leads 76 to valve 58 and leads 78 to valve 60 (FIGS. 2 and 3). Generally, valves 58 and 60 supply only ink to print characters or only solvent to flush clean the print head 40. Valves 58 and 60 are commercially available from Angar as Model 409 Solenoid Valves.

Valve 58 supplies ink axially from the bottom thereof through ink bore 80 and valve 60 supplies solvent in a like manner through solvent bore 82 to distribution system 84 internal of manifold plate 42. Distribution system 84 distributes ink and solvent from valves 58 and 60 to the dot valves 62, and comprises a pair of longitudinal bores 86 and 88 and a transverse bore 90.

Longitudinal bores 86 and 88 extend into manifold 42 normal from top edge 92. Bore 86 is aligned below and between the first and second columns 64 and 66 of dot valves 62, while bore 88 is algined below and between the third and fourth columns 68 and 70 of dot valves 62. The open ends 94 and 96 of bores 86 and 88 are sealed by such as threaded bolts 98 and 10. Transverse bore 90 extends into manifold 42 normal from side edge 102 to intersect bores 86 and 88 and fluid couple the same together. The open end 104 of transverse bore 90 is sealed by such as a threaded bolt 106.

Figure 6:
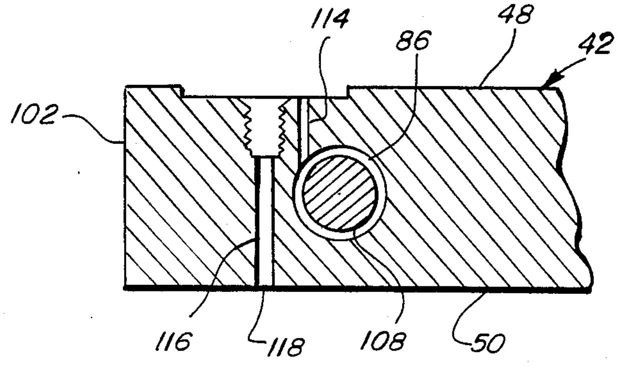
FIG. 6 is a partial sectional view of the manifold plate taken along the line 6—6 of FIG. 4 and in the direction indicated by the arrows.

Referring momentarily to FIG. 6 also, bore 86 is substantially filled with a rod 108 having a slightly smaller diameter than that of bore 86. Bore 86 can thus be of a relatively large diameter, which aids in maintaining bore 86 true to a depth much greater than its diameter, while reducing substantially the volume of bore 86 with rod 108. This reduces the quantity of ink needed to fill the distribution system 84 and the quantity of solvent necessary to flush the same. Rod 108 extends from bolt 98 to the end of bore 86. Bore 88 contains a similar rod 110 similarly situated. Bolt 106 closing transverse bore 90 extends to bore 86 and transverse bore 90 can contain a similar rod 112.

Each dot valve 62 is fluid coupled to the longitudinal bores 86 and 88 by a normal bore such as normal bore 114 in FIG. 6. Fluid, such as ink, passed by each dot valve is conducted by an outlet passage 116 having an opening 118 to the bottom side surface 50 of the manifold 42. There is one outlet passage 116 and opening 118 for each dot valve 62. Referring also to FIG. 7, each dot valve 62 is operated in a circumferential fluid in and axial fluid out configuration. Thus, ink from bore 86 passes through normal bore 114 and into circumferential opening 120 of valve 62, through the internal valving mechanism of valve 62, and out through axial opening 122 of valve 62, passageway 116 and opening 118. Valves 62 are commercially available from Angar as Model 407 Manifold Mount Subminiature Solenoid Valves.

In FIG. 8, gasket 46 is engaged against the bottom side surface 50 of manifold plate 42. Gasket 46 is made of resilient material and provides ways 124 aligned with each of the sixteen openings 118 of outlet passages 116. Gasket 46 also provides six through passages 126 for fasteners fastening the nozzle plate 44 into the manifold plate 42 and two through passages 130 for aligning the nozzle plate 44 to the manifold plate 42 with pins 132 extending outward from manifold bottom side surface 50.

Each opening into manifold bottom side surface 50 and each pin extending therefrom is located to be symmetrical with a like opening or pin that is located at 180 degrees of rotation in the plane of bottom side surface 50. The effect of this symmetrical positioning of openings and pins is that a nozzle plate can be fastened to the manifold plate in either of two positions rotated 180 degrees from one another. The effect of this geometry will be discussed in conjunction with the nozzle plate.

Figure 5:
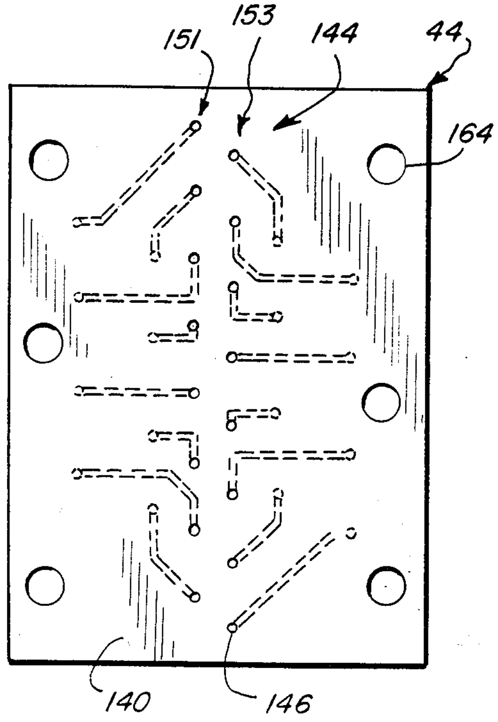
FIG. 5 is a plan view of the front side surface of a nozzle plate of the invention.

Referring to FIGS. 5 and 9, nozzle plate 44 has a front side surface 140 and a rear side surface 142. Nozzle plate is a generally rectangular solid body having a linear array 144 of sixteen nozzles 146, only one of which is indicated by a reference numeral for clarity of the drawings. The array 144 of nozzles 146 is carried on and extends from the front side surface 140 of the nozzle plate 44. Nozzle plate 44 includes sixteen nozzle passageways 148 from the nozzles to the back side surface 142, there being one nozzle passageway for each nozzle 146. Nozzle plate 44 also includes sixteen grooves 150 in the backside surface 142 thereof. Each groove 150 has one end 152 fluid connected to one nozzle passageway and another end 154 located to be in alignment with a corresponding outlet passageway 118 in the bottom side surface 50 of the manifold plate 42. The grooves 150, when the nozzle plate 44 is fastened to the manifold plate 42, thus form means for fluid coupling the manifold plate outlet passage openings to the nozzle passageways. In FIGS. 5 and 9, the nozzle plate 44 has a nozzle array 144 of widely spaced apart nozzles 146 aligned in two linear columns 151 and 153. There are eight nozzles 146 in each column and the nozzles of each column are staggered relative to the nozzles of the other column. The nozzle array thus approximates a single vertical column of interleaved nozzles.

Now referring to FIG. 10, a nozzle plate 44′ is constructed and arranged similarly to nozzle plate 44 of FIG. 9 but has a different nozzle spacing. Prime numerals thus are used to describe the like structure of FIG. 10. Nozzle plate 44′ carries a nozzle array (not shown) in which the nozzles are closely spaced, this being indicated by the closely spaced and staggered nozzle passageways 148′ arranged in columns 151′ an 153′. Again, there is a groove 150′ having one end 152′ in fluid connection with a nozzle passage 148′ and another end 154′ located to be in alignment with one manifold outlet passage opening 118 when the manifold and nozzle plates are assembled and fastened together. The grooves 150′ thus form means for fluid coupling the manifold openings 118 to the nozzle passageways 148′. In a like manner, any nozzle array spacing can be operatively used with the one manifold plate by use of the grooves for fluid coupling the manifold openings to the nozzles.

In operation, there is a certain pressure applied in reservoir or supply 72 to the ink and solvent. Operation of supply valves 58 and 60 passes this pressure to the dot valves 62 through the distribution system 86. The dot valves then act in response to the timed electrical signals on leads 34 and particularly on leads 160 (FIG. 2) to pass a desired quantity of ink under pressure through the passageways, grooves and nozzles to the carton 18 receptor. By selecting properly the timing of the signals to the dot valves, a single vertical line of dots can be printed on the carton 18 from the staggered nozzles 146 in the two columns 151 and 153. Alternatively, characters having any desired slant or curvature can be obtained or printed by selecting properly the timing relationships of signals to the several dot valves 62.

In the event that one dot is not being printed on the carton 18, the nozzle plate 44 can be removed from manifold plate 42 by removing the fasteners, such as screw 162, passing through the nozzle plate openings, such as 164, and threaded into the threaded openings in manifold plate 44. The nozzle plate 44 then is moved from the manifold plate, is rotated 180° in its plane, and is refastened to the manifold plate after aligning the manifold plate pins 132 with the nozzle plate pinholes 166 in the back side 142 of the nozzle plate. This moves the possibly clogged nozzle 146 to a new location in the dot matrix. If the non-printing dot moves with the new location of the nozzle, a clogged nozzle is confirmed. If the non-printing dot remains at the same location, then a manfunctioning dot valve or related problem is indicated.

The symmetrical geometry of the manifold and nozzle plate passageways, openings and grooves thus facilitates operational diagnostics of printing problems. The nozzle plate can be removed, rotated and reassembled quickly to diagnose malfunctioning components. Correction of a clogged nozzle can be by again removing the nozzle plate to clear the clogged nozzle and remount the nozzle plate, or by mounting a fresh nozzle plate. In the latter case, the clogged nozzle can be cleaned while the printer system is operating.

The geometry of the manifold plate and nozzle plate also facilitates changing character sizing. Mounting a new nozzle plate with a desired nozzle array spacing readies the printer system for printing the new character sizes. The mounting of the new nozzle plate occurs by removal and insertion of only six screws 162. This geometry also overcomes the prior inconvenience of connecting individual dot valves and nozzles with flexible tubing and greatly reduces the quantity of ink existing between the dot valves and nozzles. Further, by selecting the geometry of the grooves 150, the passage distances from the dot valves to the nozzles can be equalized for all the nozzles, or the distances can be varied as desired.

Variations of the structure of the invention from that disclosed in the preferred embodiment is possible. The relative positions of the manifold supply and dot valves and distribution system can be altered while obtaining the same result. Different valves can be used. The disclosed geometry of the manifold plate outlet passageway openings and nozzle plate grooves can be altered. In this later case, the relative positioning of the outlet passageway openings and grooves is important, not their specific location.

Additionally the configuration of the nozzle plate can be adjusted to provide a single, rectilinear array of nozzles. This eliminates staggering the timed signals to the dot valves for printing a straight line. Also, the manifold plate can be configured to have only seven (7) dot valves operating only the seven nozzles at one end of a sixteen (16) nozzle nozzle plate. In this case, rotation of the nozzle plate 180 degrees brings fresh nozzles into use.

It is therefore to be understood that, within the scope of the appended claims, the invention can be practiced otherwise than as specifically described.

I claim:

1. A drop-on-demand printer system printing characters in dot matrix format on a receptor moved in proximate printing relationship thereby, the system comprising:

A. a supply of ink, the ink being used to print individual dots of the dot matrix characters on said receptor;

B. controller means producing timed electrical signals that indicate formation of the dots of the dot matrix characters in timed relationship with movement of the receptor proximate the printer system;

C. a manifold plate formed of a rectangular solid body having four edge side surfaces and top and bottom side surfaces, the bottom side surface being adapted to face said receptor, the manifold plate carrying on its top side surface a plurality of dot valves arranged in four columns, each dot valve receiving one of said timed electrical signals, the manifold plate including two longitudinal bores therethrough aligned, respectively, below and between the first and second columns of said dot valves, and below and between the third and fourth columns of dot valves and further including a transverse bore fluid coupling together said two longitudinal bores, said longitudinal and transverse bores being sealed at the openings thereof to the edge side surfaces of the manifold plate, the manifold plate including normal bores fluid coupling each dot valve to its respectively aligned longitudinal bore, the manifold plate carrying on its top side surface an ink supply valve that is in fluid connection with the ink supply and the respective two longitudinal bores, the manifold plate including a plurality one for each dot valve, of spaced apart through outlet passages opening to said bottom side surface, each outlet passage opening being located in symmetrical relationship with another outlet passage opening located at 180 degrees of rotation in the plane of the bottom side surface, each outlet passage conducting ink from one dot valve to said bottom side surface;

D. a gasket of resilient material engaged against said manifold plate bottom side surface and having ways therethrough aligned with said manifold plate outlet passage openings;

E. a nozzle plate formed of a rectangular solid body having front and back side surfaces, the nozzle plate being fastened to said manifold plate with the gasket therebetween, the manifold plate bottom side surface and the nozzle plate back side surface being juxtaposed and the nozzle plate front side surface being adapted to face the receptor, the nozzle plate carrying a linear array of nozzles extending from said front side surface, the nozzle plate including a plurality, one for each nozzle, of nozzle passageways from said nozzles to said back side surface, and a plurality of grooves in said back side surface, each groove having one end in fluid connection with one nozzle passageway and another end aligned with one way of said gasket and one of said openings in said manifold plate bottom side surface, so that ink, passed by one of said dot valves in response to a timed electrical signal, passes through one outlet passageway to one groove, one nozzle passageway and one nozzle to the receptor.

2. The printer system of claim 1 in which the linear array of nozzles includes two columns of nozzles, eight nozzles in each column and the nozzles of each column are staggered relative to the nozzles of the other column.

3. The printer system of claim 1 in which each longitudinal and transverse bore includes a rod contained therein to reduce the volume thereof.

4. The printer system of claim 1 including a solvent supply, the solvent being used to flush ink from said system, the manifold plate carrying on its top side surface a solvent supply valve in fluid connection with said solvent supply, and said ink supply valve being aligned with and supplying ink to one longitudinal bore and solvent supply valve being aligned with and supplying solvent to the other longitudinal bore.

5. The printer system of claim 1 in which one of said manifold plate and nozzle plate carries alignment pins while the other carries alignment pinholes, so that the manifold and nozzle plates can be mounted together in either one of two positions that are rotated 180 degrees from one another.

6. The printer system of claim 5 in which said manifold plate carries said pins on said bottom side surface and said nozzle plate includes said pinholes on said back side surface.

7. A print head assembly for use in a drop-on-demand printer system, the system printing characters in a dot matrix format on a receptor moved thereby from a linear array of nozzles, the print head assembly receiving ink from an ink supply to form the characters, the assembly further receiving timed electrical signals from a character generator controller indicating the formation of the dots of the dot matrix of the characters in timed relationship to movement of the receptor, the print head assembly comprising:

A. a manifold plate that is generally rectangular and that is arranged to have its bottom side surface facing said receptor, the manifold plate carrying on its top side surface a plurality of dot valves receiving said timed signals and there being one dot valve for each nozzle of the array, the manifold plate including bores therethrough for distributing the received ink to the dot valves, and including a plurality, one for each dot valve, of through outlet passages opening to said bottom side surface through which the ink from each dot valve passes, each outlet passage opening being located in symmetrical relationship with an outlet passage opening located at 180 degrees of rotation in the plane of the bottom side surface;

B. a gasket of resilient material engaged against said manifold plate bottom side surface and having ways therethrough aligned with said manifold plate outlet passage openings; and C. a nozzle plate that is generally rectangular arranged adjacent said manifold plate bottom side surface with said gasket therebetween, the nozzle plate including a plurality, one for each dot valve, of nozzles extending from the nozzle plate front side surface, the nozzles being linearly arranged at a certain spacing to produce ink dots of said matrix fron ink passed thereto, the nozzle plate back side surface including grooves for fluid coupling each manifold plate outlet passage opening to one nozzle.

8. The print head assembly of claim 7 in which said manifold plate includes two longitudinal bores and a transverse bore therethrough for distributing the receiving ink, the dot valves being arranged along sides of said longitudinal bores, and there being normal bores from the longitudinal bores to each of the dot valves, the manifold plate further carrying on its top side surface an ink supply valve supplying ink to one of said bores from an ink supply.

9. The print head assembly of claim 8 in which said manifold plate carries on its top side surface a solvent supply valve supplying solvent to another one of said bores from a solvent supply.

10. The print head assembly of claim 8 in which said bores contain rods therein substantially reducing the volumes thereof.

11. The print head assembly of claim 7 in which said nozzles are arranged in two columns with the nozzles of the two columns being staggered.

12. The print head assembly of claim 7 in which said manifold plate bottom side surface carries one of alignment pins and pinholes, said nozzle plate back side surface includes the other of alignment pins and pinholes for aligning said manifold and nozzle plates in either one of two mounting positions that are 180 degrees rotated from one another.

13. A printing head for a drop-on-demand printing system that prints different sized dot matrix characters on a receptor with correspondingly sized linear nozzle arrays, the printing head comprising:

A. a manifold plate having top and bottom side surfaces, the manifold plate including internal bores supplying ink to dot valves carried on the manifold plate top side surface, there being one dot valve for each nozzle of an array, and there being one ink outlet passage through the manifold plate and opening to the bottom side surface for each of the dot valves, each outlet passageway conducting the ink passed by one dot valve; and B. a nozzle plate for each desired nozzle array, the nozzle plate having front and back side surfaces, the nozzles extending from said front side surface and said back side surface being fastened adjacent the manifold plate bottom side surface, the nozzle plate including conduit means adapted to fluid couple each ink outlet passage to one of said nozzles, so that different nozzle plates can be fastened to said manifold plate to form different sized dot matrix characters while each dot valve controls the ink passed to one nozzle of an array.

14. The printing head of claim 13 in which said means are grooves formed in said nozzle backside surface and sealed from one another when the manifold and nozzle plates are fastened together, each groove having one end in fluid connection with a nozzle passageway leading to one of said nozzles and having a second end aligned to be in fluid connection with one of the manifold ink outlet passage openings.

15. The printing head of claim 13 in which each array includes nozzles arranged staggered in two columns, the desired arrays having the nozzles spaced apart at different distances.

16. The printing head of claim 13 in which the internal bores contain rods therein reducing the volume of the bores.

17. The printing head of claim 13 in which said manifold plate bottom side surface includes one of alignment pins and pinholes and the nozzle plates include the other of alignment pins and pinholes to align the manifold and nozzle plates to one another.

18. The printing head of claim 13 in which each manifold ink output passge opening is symmetrically located with one another such opening at 180 degrees of rotation in the plane of said manifold bottom side surface, so that each of said nozzle plates can mount in either one of two positions located at 180 degrees of rotation to one another.

* * * * *